United States Patent

Hottinen et al.

[11] Patent Number: 5,995,499
[45] Date of Patent: Nov. 30, 1999

[54] SIGNAL DETECTION IN A TDMA SYSTEM

[75] Inventors: Ari Hottinen, Vantaa; Pekka Ranta, Espoo; ZhiChun Honkasalo, Helsinki; Harri Jokinen, Hiisi, all of Finland

[73] Assignee: Nokia Telecommunications Oy, Espoo, Finland

[21] Appl. No.: 08/817,178

[22] PCT Filed: Oct. 5, 1995

[86] PCT No.: PCT/FI95/00551

§ 371 Date: Apr. 7, 1997

§ 102(e) Date: Apr. 7, 1997

[87] PCT Pub. No.: WO96/11533

PCT Pub. Date: Apr. 18, 1996

[30] Foreign Application Priority Data

Oct. 7, 1994 [FI] Finland .................................. 944736

[51] Int. Cl.[6] .................................................. H04B 7/212
[52] U.S. Cl. ........................... 370/337; 370/347; 375/349
[58] Field of Search ..................................... 370/201, 292, 370/337, 345, 347, 350, 442, 503; 375/316, 340, 341, 346, 348, 349; 455/63, 65, 67.3

[56] References Cited

U.S. PATENT DOCUMENTS

| 4,995,104 | 2/1991 | Gitlin ....................................... 370/201 |
| 5,199,047 | 3/1993 | Koch ........................................ 375/231 |
| 5,303,226 | 4/1994 | Okanoue et al. ........................ 370/442 |
| 5,373,507 | 12/1994 | Skold ...................................... 370/347 |
| 5,533,067 | 7/1996 | Jamal et al. ............................. 375/341 |
| 5,596,607 | 1/1997 | Larsson et al. .......................... 375/340 |
| 5,768,254 | 6/1998 | Papadopoulos et al. ............... 370/201 |

FOREIGN PATENT DOCUMENTS

| 409 171 | 1/1991 | European Pat. Off. . |
| 602 249 | 6/1994 | European Pat. Off. . |
| 604 208 | 6/1994 | European Pat. Off. . |
| 667 683 | 8/1995 | European Pat. Off. . |

OTHER PUBLICATIONS

Giridhar, Joint Demodulation of Cochannel Signals Using MLSE and MAPSD Algorithms, 1993 IEEE, pp. IV-160-163.

Giridhar, Joint Estimation Algorithms for Cochannel Signal Demodulation, 9113 IEEE, pp. 1497-1501.

Eyuboglu, Reduced-State Sequence Estimation with Set partitioning and Decision Feedback, IEEE 1988, pp. 13-20.

Anderson, Sequential Coding Algorithms: A Survey and Cost Analysis, 9184 IEEE pp. 169-176.

Simon Haykin, Blind Deconvolution, pp. 1-289.

*Primary Examiner*—Chi H. Pham
*Assistant Examiner*—Ricey Ngo
*Attorney, Agent, or Firm*—Pillsbury Madison & Sutro LLP

[57] ABSTRACT

A signal detection method in a TDMA mobile system with co-channel interference and receivers implementing the method. In the method, a primary signal ($r_1$) and at least one interfering co-channel signal ($r_2$–$r_N$) are received on the same TDMA channel ($F_1$, $TS_3$). The co-channel signals propagate through multipath channels ($h_{L,1} \ldots h_{L,N}$) independent of one another, which provide them with a unique wave form coding. In addition, the co-channel signals have different but known training sequences. The multipath channel estimates of the primary signal ($r_1$) and the at least one interfering co-channel signal ($r_2$–$r_N$) are determined through the received training sequences. After this, the primary signal is detected by utilizing the transmission channel estimates of both the primary signal and the at least one interfering co-channel signal.

15 Claims, 3 Drawing Sheets

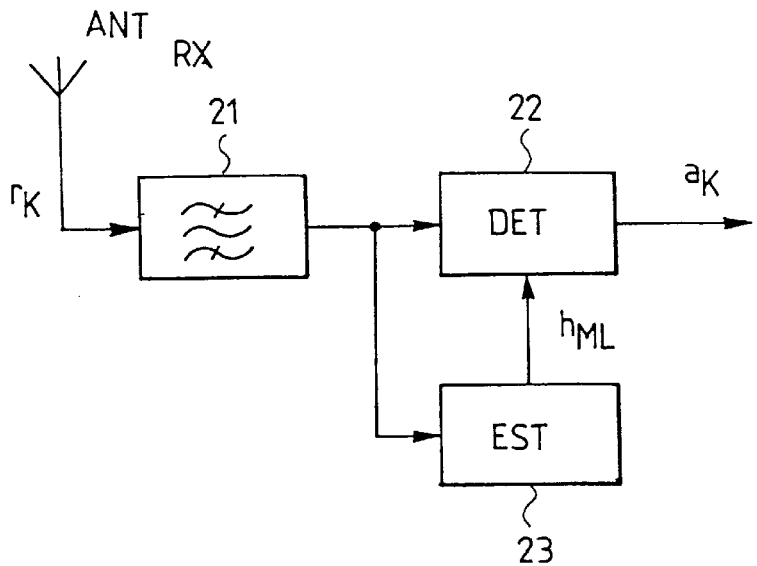
FIG. 2
FIG. 4a
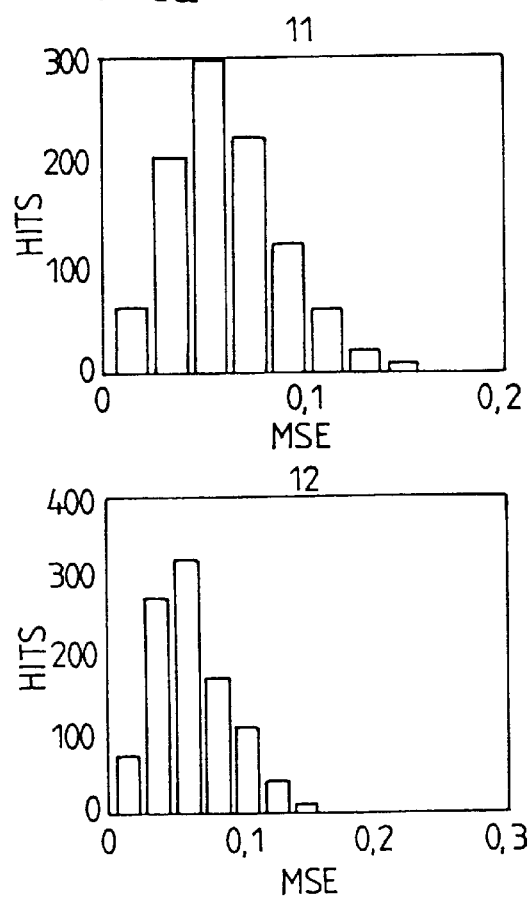
FIG. 4c
FIG. 4b
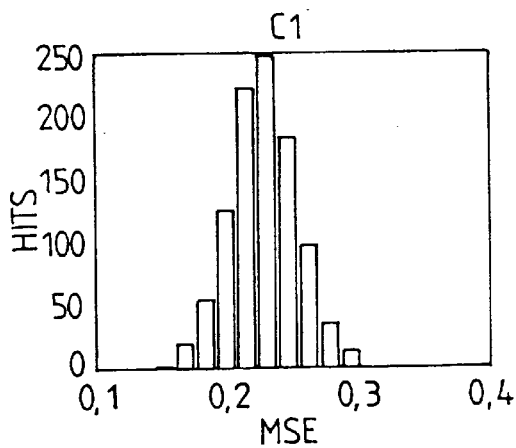
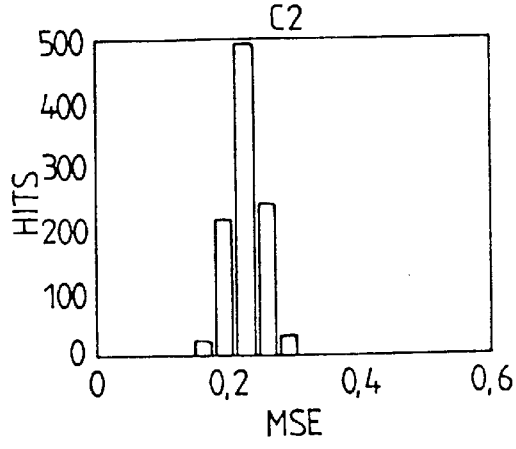
FIG. 4d

| TAIL 3 | INFORMATION 58 | TRAINING SEQUENCE 26 | INFORMATION 58 | TAIL 3 |

SIGNAL DETECTION IN A TDMA SYSTEM

This application is the national phase of international application PCT/FI95/00551 filed Oct. 5, 1995 which designated the U.S.

BACKGROUND OF THE INVENTION

1. Field of the Invention

The present invention relates to a signal detection method in a receiver of a TDMA radio system, in which a primary signal and at least one interfering co-channel signal are received on the same TDMA channel, said signals having different but known training sequences and having different multipath propagation and thus different transmission channels on the radio path.

2. Description of Related Art

In future development of cellular mobile networks, the availability of the radio spectrum will be one of the key problems. In narrowband mobile systems, co-channel interference (CCI) is one of the main factors limiting system capacity. Conventionally, system capacity has been increased in this respect by increasing the geographical re-use of frequencies while decreasing cell size and transmission power. Of course, this is not the preferred manner, since the infrastructure may become intolerably expensive. Another possibility of solving the capacity problem is to follow the rapid development of digital signal processing and to utilize the rather complex interference cancelling algorithms. The removal of co-channel interference in a receiver enables a more efficient re-use of frequencies in a network.

In current mobile systems, co-channel signals are approximated as random additive white Gaussian noise in receivers. However, this approximation is sufficient only if interfering co-channel signals are sufficiently weak, which can be ensured by an appropriate degree of re-use of frequencies in a conventional cellular system. However, this is not the case in interference limited cellular systems. Actually, co-channel interference is typically deterministic in nature, which means that it should be possible to remove at least part of its influence.

Interference cancellation (IC) is already a popular issue in connection with code division multiple access systems (CDMA). Applying interference cancellation techniques to narrowband TDMA systems is, however, basically a more difficult task than in CDMA systems, where information on transmitted wave forms is available in advance in an interference cancelling receiver.

A radio transmitter signal usually undergoes so called multipath propagation, where the signal propagates along several different paths due to obstacles and reflections and arrives at a receiver as several signal components delayed in different ways. In digital systems, this so called time dispersion causes intersymbol interference (ISI), in which interference successive symbols are partly superimposed, which complicates demodulation in the receiver. In the pan-European mobile communications system GSM, a preknown training sequence is included in a signal to be transmitted. This makes it is possible to estimate in a receiver the multipath channel via which the signal has travelled on the radio path. This estimated channel model allows the reciever to correct the received signal and to use the estimated channel model in the equalizer and demodulator of the receiver in the Viterbi algorithm. The GSM system specifies eight different training sequences in such a manner that it is possible to allocate different training sequences to channels using the same frequencies in cells which are sufficiently close to interfere with one another. A receiver can thus distinguish the correct signal from an interfering signal arriving at the same time. Since in a typical cellular system, such as the GSM, co-channel interference is kept, if possible, as low as possible by means of cellular network frequency planning, it is treated in a receiver merely as random Gaussian noise. Actual channel estimation, equalization and detection are performed without information on other co-channel signals. This does not cause problems in a correctly planned cellular network, where the distance between cells using the same channel is sufficiently long. However, if the utilization of a frequency band is to be increased by increasing the geographical re-use of frequencies in a cellular network, i.e. by bringing the cells using the same channel closer to one another, or by starting to use the same channels in the entire network like in CDMA systems, problems will arise. The signals superimposed in a receiver thus effectively bias the channel models estimated for each signal, which in turn degrades the performance of Viterbi decoders, for instance. For instance, in the GSM system, the cross correlation of training sequences is relatively low, which leads to biased channel estimates for co-channel users. In the GSM system, the training sequences were selected with the emphasis on the auto correlation properties thereof, since the principle in planning the system was not the optimal utilization of bandwidth, the effect of co-channel training sequences being cancelled by using an intercellular distance of at least seven cells in frequency re-use. Thus, in the current TDMA systems, increasing the degree of re-use of frequencies or allowing co-channel users is not possible without essentially degrading the performance of the system and especially that of receivers.

In "Joint Estimation Algorithms for Cochannel Signal Demodulation", K. Giridhar et al., Proceedings of ICC, 1993, and "Joint Demodulation of Cochannel Signals Using MLSE and MAPDS Algorithms, K. Giridhar et al., Proceedings of ICASSI'93, 1993, are disclosed methods in which a detection algorithm detects co-channel signals, but the actual estimates of the co-channel signals are not determined. This is thus only a partial solution to the problem.

BRIEF SUMMARY OF THE INVENTION

The object of the present invention is thus to improve signal detection in a TDMA mobile system having co-channel interference.

This is achieved with a signal detection method in a receiver of a TDMA mobile system, in which method a primary signal and at least one interfering co-channel signal are received on the same TDMA channel, the signals having different but known training sequences, and the signals having different multipath propagation and thus different transmission channels on the radio path. The method of the invention determines the transmission channel estimates of the primary signal and the at least one interfering co-channel signal by means of the received training sequences and detecting the primary signal by utilizing the transmission channel estimates of both the primary signal and the at least one interfering co-channel signal.

The invention also relates to a receiver of a synchronous TDMA mobile system, the receiver being arranged to receive a primary signal and at least one interfering co-channel signal on the same TDMA channel. The signals have different but known training sequences and have different multipath propagation and thus different transmission channels on the radio path. The receiver of the present invention comprises a channel estimator, arranged to determine the transmission channel estimates of the primary signal and the at least one interfering co-channel signal by means of the received training sequences, and a detecting section, detecting the primary signal by utilizing the transmission channel estimates of both the primary signal and the at least one interfering co-channel signal.

The invention further also relates to a signal detection method in a receiver of a TDMA mobile system, in which a primary signal and at least one interfering co-channel signal are received, preferably asynchronously, on the same TDMA channel, the signals having different but known training sequences and said signals having different multipath propagation and thus different transmission channels on the radio path. The method of the invention includes determining a transmission channel estimate of the at least one interfering co-channel signal, regenerating an interfering signal from the received signal by utilizing the transmission channel estimate of the interfering co-channel signal, subtracting the regenerated interfering co-channel signal from the received signal, determining a transmission channel estimate of the primary signal, and detecting the primary signal by using this transmission channel estimate.

The starting point of the invention is to utilize the known training sequences of all users of a TDMA system in such a manner that a better channel estimate is obtained for the primary signal. This type of joint estimation of several co-channel signals is necessary because channel estimation is performed in the presence of other co-channel signals, which severely degrade the reliability of the channel estimation due to cross correlation interference. This joint channel estimation utilizes the observation made by the inventors, relating to multipath propagation, that co-channel signals propagate via independent multipath channels, which provide a unique wave form coding for each signal. This wave form coding produces signal states that do not overlap, and thus it enables joint detection and joint channel estimation at a receiver. In the preferred embodiment of the invention, the cross correlation between training sequences is cancelled by performing a linear transformation on a conventional channel estimate. This can conveniently be carried out as matrix operations, whereby the linear transformation may be for instance a cross correlation matrix of the training sequences of active co-channel users. This requires essentially synchronous reception of co-channel bursts. This restriction is not due to the actual detection algorithm but to the fact that it is necessary to make the training sequences overlap entirely in order to enable the estimation of channel parameters. In practice, even if a synchronized network is assumed, a minor timing error always exists as a result of the propagation delay between co-channel bursts. The channel estimation algorithm of the invention could still recover from asynchronism of at least a few bits, if the training sequence is suitably planned. While using the training sequences of the GSM system, a timing error of about three bits could be allowed, depending on the number of estimated channel taps. If the requirement of synchronous reception is omitted, adaptive methods are used according to a second embodiment of the invention. Only the training sequence of the desired signal, the primary signal, is available at a receiver, and the co-channel must thus be identified by means of "blind" estimation methods. Joint channel estimation and data detection are suggested to be used for this purpose (decision-directed clustering, for instance). Signals can be "cleaned" of interference iteratively by estimating the channel of the interferer, regenerating this interfering signal over the training sequence (convolution of the training sequence with the channel estimate), and subtracting the regenerated signal from the received signal. This method can be used recursively, i.e. by successively estimating and regenerating a user k signal and subtracting it for instance from the sum signal of K co-channel users. Each iteration stage produces a slightly better channel estimate and data detection. The estimation and regeneration of co-channel signals may also take place as a parallel process.

The invention will be described below in more detail by means of preferred embodiments.

BRIEF DESCRIPTION OF THE DRAWINGS

FIG. 2 is a block diagram illustrating the receiver of the invention and wave form coding taking place through multipath propagation, FIGS. 4a, 4b, 4c and 4d are histograms representing the distribution of the mean square errors (MSE) of the channel estimates 11, 12 of the invention and of conventional channel estimates C1, C2, respectively.

DETAILED DESCRIPTION OF THE INVENTION

The present invention can be used in all TDMA mobile systems, when several co-channel users or high co-channel interference are allowed. In the present application, the pan-European mobile communications system GSM is used as an example of a digital TDMA system, without however restricting the invention to it. If required, more detailed information on the GSM system is available in the GSM specifications and in "The GSM System for Mobile Communications", M. Mouly & M. Pautet, Palaiseau, France, 1992, ISBN: 2-9507190-0-0-7.

Figure 1A:
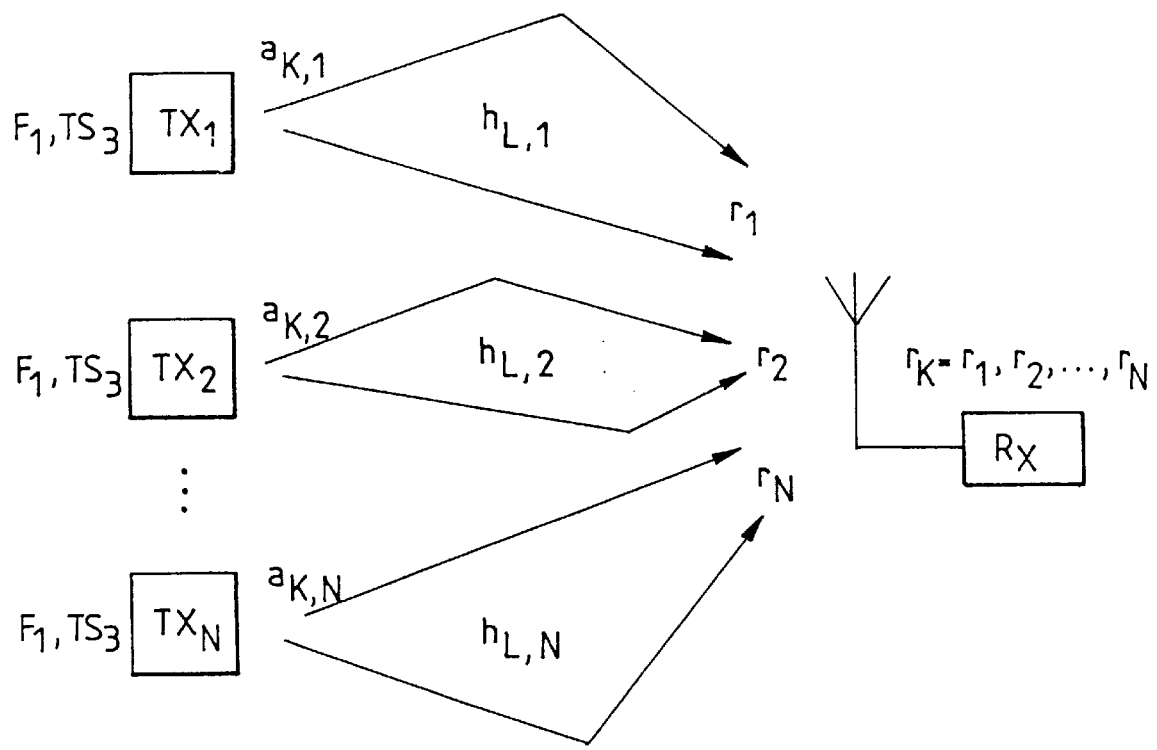
FIGS. 1a and b illustrates the interference limited TDMA system of the invention, the system having several co-channel users.

FIG. 1A illustrates an interference limited TDMA system of the invention having several concurrent co-channel users. The system comprises N transmitters $TX_1, TX_2, \ldots, TX_N$, which all transmit at the same frequency F1 and in the same time slot $TS_3$. Each transmitter transmits, within the time slot, a short modulated radio-frequency signal, i.e. a burst, which contains a signal sequence (a bit pattern) $a_{k,1}, a_{k,2}, \ldots, a_{k,N}$ to be transmitted. In a manner typical of radio systems, the propagation of the transmitted burst is usually multipath propagation, which means that a signal travels from a transmitter to a receiver Rx along several different paths while reflecting from different obstacles, such as buildings, whereby the signal sequence arriving at the receiver Rx consists of several signal components arriving with different delays. In a mobile system, each co-channel signal has dedicated, different multipath propagation, which can be represented by a multipath channel which has a certain impulse response and which provides a unique wave form coding for the signal. The signal sequences $a_{k,1} \ldots a_{k,N}$ transmitted in FIG. 1A travel through multipath channels $h_{L,1} \ldots h_{L,N}$, respectively, whereby wave form coded signals $r_1 \ldots r_N$ are received in the receiver Rx, the signals summing up to a sum signal $r_k$. The present invention utilizes the wave form coding provided by different multipath channels in cancelling co-channel interference.

Figure 1B:
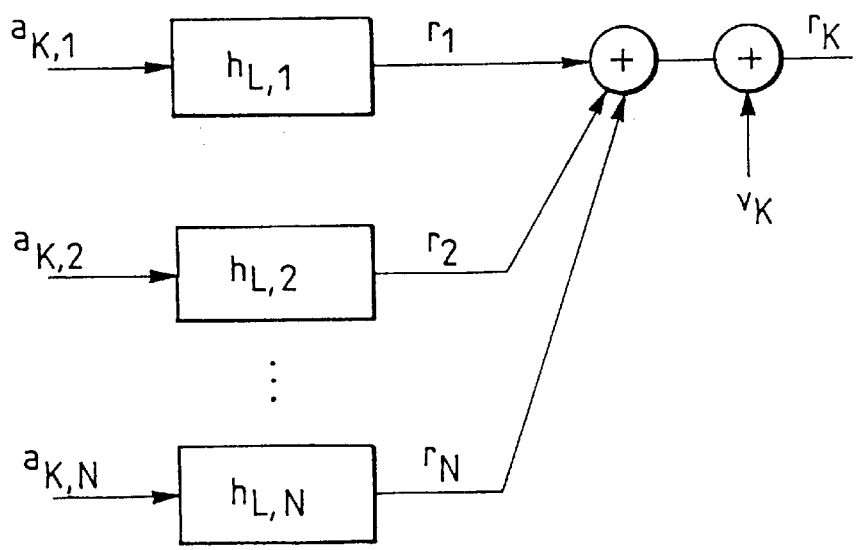

FIG. 1B shows the discrete time model for FIG. 1A. It consists of N co-channel signals, each of which has an independent time-variant complex channel impulse response $h_{0,n}, h_{1,n}, \ldots, h_{L,N}$. Vectors $a_{1,n}, a_{2,n}$ represent the transmitted symbol sequences in each N channels, and $r_1, r_2, \ldots, r_K$ the received signal sequences in each N channels. A vector $v_k$ consists of independent white Gaussian noise. It should be noticed that the model is simplified in the sense that it assumes the length of a channel memory L to be finite and equal for all channels. However, in regards a receiver, this model describes the system accurately enough, since practical receiver algorithms are usually capable of handling only finite impulse responses.

A received signal, when it is sampled once per symbol, can be written as follows $$r_k = \sum_{N=1}^{N} \sum_{l=0}^{L} h_{l,n} a_{l-k,n} + v_k. \tag{1}$$

Now, the problem is to detect the transmitted data sequences $a_{k,n}$ in the received signal $r_K$ in the presence of thermal noise. This is possible with high probability if 1) the co-channel signals can be separated, which requires that the N channel responses $h_{L,n}$ are independent and have low correlation, 2) the parameters of the channel or the estimates thereof are known and 3) the noise level is low enough. The first condition is fundamentally essential in order to avoid the overlap of possible signal states at the receiver, which is a basis for all signal detection attempts. Fortunately, the requirement 1) is inherently fulfilled in a mobile environment due to time-variant multipath channels. Another way of seeing this is that multipath channels provide a memory which can be advantageously utilized in the detection process. The condition 2) is also fulfilled since the joint estimation of channel parameters can be carried out for instance by means of different training sequences, which are transmitted through the channels.

FIG. 2 shows a simplified block diagram of the receiver according to the preferred embodiment of the invention. FIG. 2 contains only the blocks essential for describing the invention, but it will be apparent to one skilled in the art that a conventional TDMA receiver also comprises many other functions and structures the detailed description of which is not necessary in this context. In practice, the receiver may be for instance a receiver normal in the GSM system, in which receiver the joint channel estimation and the joint detection of the invention are used instead of conventional channel estimation and signal detection. In FIG. 2, a sum signal $r_K$ received in an antenna $ANTE_{RX}$ is filtered by a bandpass filter 21, which separates the frequencies external to the receiving band. The bandpass filtered signal $r_K$ is applied to a detector DET 22 and to a channel estimator 23. The channel estimator 23 provides the channel estimates $h_{ML}$, of the co-channel signals, which channel estimates the detector 22, preferably a Viterbi detector, uses for detecting the primary signal. In the following, channel estimation and signal detection will be described separately.

Channel Estimation

In the following will be described the joint channel estimation method of several co-channel signals according to the invention by using as an example signals of a GSM type system, in which signals the training sequence is located in the middle of a burst, as in the normal GSM burst in FIG. 3. A normal burst contains two 58-bit information packets, which surround a 26-bit training sequence located in the middle. Three "tail bits" (set to zero) are added on both sides of the burst. Since the training sequence is located in the middle of the burst, it is sometimes referred to as a "midamble."

The joint channel estimation method of the invention is necessary, because channel estimation is carried out in the presence of other co-channel signals, which cause severe degradation in the reliability of the channel estimation due to cross correlation disturbance. The cross correlation between training sequences can be removed from a conventional channel estimate by subjecting it to linear transformation. This linear transformation can conveniently be performed by means of matrix operations.

Assume that there are N synchronous co-channels, i.e. the primary user and N−1 interferers each having a different "multipath channel". Denote these N multipath radio channels as follows $$h_{L,n} = (h_{0,n}, h_{1,n}, \ldots, h_{L,n})^T, n=1,2, \ldots, N, \tag{2}$$

the length of each of which is (L+1) with complex channel tap weights. Collect the channel impulse responses into a vector h as follows $$h = (h_{L,1}{}^T, h_{L,2}{}^T, \ldots, h_{L,N}{}^T)^T. \tag{3}$$

The number of parameters above is thus N×(L+1). The training sequence, partitioned into preamble and midamble codes, of the $n^{th}$ channel is denoted by $$m_n = (m_{0,n}, \ldots, m_{p+L-1,n})^T, n=1,2, \ldots N, \tag{4}$$

with L+P elements $m_{p,n}$, where L is the length of the preamble code, equal to the length of the channel memory, and P is the length of the midamble code. The first L bits are preamble code bits, and the next P bits are midamble code bits.

The received signal corresponding to the midamble code bits is thus $$y = Mh + v \tag{5}$$

where v represents Gaussian noise samples, and the matrix $M = (M_1, M_2, \ldots, M_N)$, where $M_n$ is P×(L+1) matrix consisting of the transmitted training sequence symbols organized as a matrix The maximum likelihood channel estimate is $$M_n = \begin{bmatrix} m_{L,n} & \ldots & m_{1,n} & m_{0,n} \\ m_{L+1,n} & \ldots & m_{2,n} & m_{1,n} \\ \vdots & & \vdots & \vdots \\ m_{P+L-1,n} & \ldots & m_{P,n} & m_{P-1,n} \end{bmatrix}. \tag{6}$$

obtained by the equation $$\hat{h}_{ML} = (M^{*T}M)^{-1}M^{*T}y. \tag{7}$$

and assuming that the noise is white, the equation (7) is reduced to $$\hat{h}_{ML} = (M^{*T}M)^{-1}M^{*T}y = (\hat{h}_1{}^T, \hat{h}_2{}^T, \ldots, \hat{h}_N{}^T)^T \tag{8}$$

In other words, this results in the estimates of the multipath channel of the primary signal and the multipath channels of the interfering co-channel signals, which estimates the channel estimator 23 gives to the detector 22 for detection. It should be noticed that the result is equivalent to a conventional channel estimator when N=1. The equation (8) includes a correlation matrix $M^{*T}M$ in brackets, by the inverse matrix of which is produced the linear transformation to a conventional channel estimate according to the invention.

In the embodiment described above, the maximum likelihood estimate is used for a multipath channel, since the cross correlation of the GSM training sequences is high. Alternatively, or in addition to this, better training sequences with regard to cross correlation could be used. Particularly advantageous training sequences are obtained by using a sequence having good periodic autocorrelation and sequences transformed cyclically therefrom with other signals of the same channel (for instance an m-sequence).

In the following example, the improved channel estimate of the invention is examined in comparison with conventional channel estimates.

EXAMPLE

Assume that user 1 has a discrete channel $h_0(z)=1,0+0,5z^{-1}$ and user 2 has a discrete channel $h_1(z)=0,346(1,0+0,2z^{-1})$. Also assume that the GSM training sequences are used for estimating the channels by using the equations (7) and (8) in such a manner that improved channel estimates 11 and 12 and conventional estimates C1 and C2 are obtained. FIGS. 4*a*, *b*, *c* and *d* show the histograms representing the mean square errors (MSE) of the improved channel estimates 11 and 12 and the conventional estimates C1 and C2 (the numeral index refers to the user). The improvement obtained by means of the invention in the channel estimate is apparent.

Joint Detection

Signal detection can be implemented for instance by receivers approximating maximum likelihood (ML) or maximum posterior (MAP) decisions. The former is preferably implemented for instance by MLSE (Maximum Likelihood Sequence Estimation) algorithms, such as the Viterbi algorithm and the modifications thereof. The theoretical difference between these two is due to the fact that the MAP detection uses the criterion $$\max_{a_{k,N}} p(a_{k,1}, \ldots, a_{k,N} \mid r_K)$$

whereas the ML detection uses the criterion $$\max_{a_{k,N}} p(r_k \mid a_{k,1}, \ldots, a_{k,N})$$

The articles by Giridhar mentioned above present algorithmic methods for the vectorial solutions of the above equations, when p(.) is known.

In the following, let us examine the ML detection in more detail. It is well known that the optimum detection algorithm in the presence of intersymbol interference (ISI) and white Gaussian noise is MLSE, which can be implemented recursively by the Viterbi algorithm. It has been shown that MLSE can be directly extended to the detection of multiple co-channel signals with simultaneous ISI compensation. This algorithm is called JOINT-MLSE (JMLSE). By using the standard trellis search technique, it is possible to find the most likely transmitted symbol sequences among all possible sequences by using the maximum likelihood criterion $$\max[p(r_K \mid a_{k,1}, a_{k,2}, \ldots, a_{k,N})], \quad (9)$$

$$a_{k,N}$$

$$n \in [1, N]$$

where $p(r_k \mid a_{k,1}, a_{k,2}, \ldots, a_{k,N})$ is the joint probability density function of those random variables in the signal $r_K$ which condition the transmitted sequences $a_{k,n}$. The most likely transmitted symbol sequences are those which maximize the quantity presented above. If the additive noise is independent in the signal $r_k$, the joint probability density function can be written as the product of the density functions of those samples $r_k$ which condition the transmitted symbols $a_{k,n}$. The equation (9) can thus be simplified into the form $$\max\left[\sum_{k=1}^{K} p(r_k \mid a_{k,1}, a_{k,2}, \ldots, a_{k,N})\right]. \quad (10)$$

$$a_{k,N}$$

$$n \in [1, N]$$

In addition, assuming that the additive noise is Gaussian distributed according to the conditional probability density function formulated as $$p(r_k \mid a_{k,1} a_{k,2}, \ldots, A_{k,n}) = (2\pi\sigma)^{-1/2} |r_k - \sum_{n=1}^{N} \sum_{l=0}^{L} h_{l,n} a_{l-k,n}|^2 \quad (11)$$

it is preferable to apply a logarithm to the equation (10), and the original criterion in the equation (9) can simply be written as $$\min\left[\sum_{k=1}^{K}\left|r_k - \sum_{n=1}^{N}\sum_{l=0}^{L} h_{l,n} a_{l-k,n}\right|^2\right]. \quad (12)$$

$$a_{k,N}$$

$$n \in [1, N]$$

This equation simply returns the minimum sum of the Euclidean distances in the (L+1) dimensional space with $2^{N(L+1)}$ possible signal states.

Since the use of the Viterbi algorithm requires a recursive formulation of the probability function, the final form of the JMLSE path metrics is $$J_k(a_{k,n}) = J_{k-1}(a_{k-1,n}) + \left|r_k - \sum_{n=1}^{N}\sum_{l=0}^{L} h_{l,n} a_{l-k,n}\right|, \quad (13)$$

where the term $J_{k-1}(a_{k-1,n})$, n=1,2, . . . ,N represents the survivor path metrics in the previous response of the trellis. In fact, the path metrics of a conventional Viterbi detector is similar as in the equation (12), except that n can only have the value 1. In other words, the difference is that in every symbol period, JMLSE weights the symbols ($a_{k,1}, a_{k,2}, \ldots, a_{k,N}$) jointly instead of weighting the symbol $a_{k,1}$ alone.

As the final result, the JMLSE algorithm according to the equation (13) selects for the primary signal the most likely transmitted symbol sequence $a_{k,1}$ out of all possible symbol sequences, which symbol sequence is provided as an output from the detector 22.

The number of states in the JMLSE trellis is 2NL. Due to the computational limitations of practical receivers, the product NL cannot be allowed to become very high. This obviously limits that number of co-channel signals which can be jointly detected, or alternatively, the multipath spread which can be tolerated. The complexity of the trellis can however be reduced by using known methods, disclosed for instance in "Reduced State Sequence Estimation with Set Partitioning and Decision Feedback", M. V. Eyuboglu, S. V. Queshi, IEEE Trans. Information Theory, Vol. COM-36, No. 1, p. 13–20, January 1988, and "Sequential Coding Algorithms: A survey and cost analysis, Anderson, Mohan, IEEE Trans., Vol. COM-32, p. 1689–6696, 1984. However, in TDMA mobile systems it is usually sensible to concentrate only on dominant interferers and treat the others as noise.

The channel estimation according to the equations (7) and (8) combined with joint detection requires essentially synchronous reception, as stated above. If, however, the requirement of synchronous reception is omitted, adaptive methods can be used in channel estimation. Only the training sequence of the desired signal is available at a receiver, and therefore the co-channel must be identified by means of blind estimation methods, described for instance in "Blind Deconvolution", S. Haykin, Prentice Hall Information and System Sciences Series, New Jersey, 1994. A method where channel estimation and data detection are combined (for instance decision-directed clustering) can be used for this purpose.

Figures 3, 5:
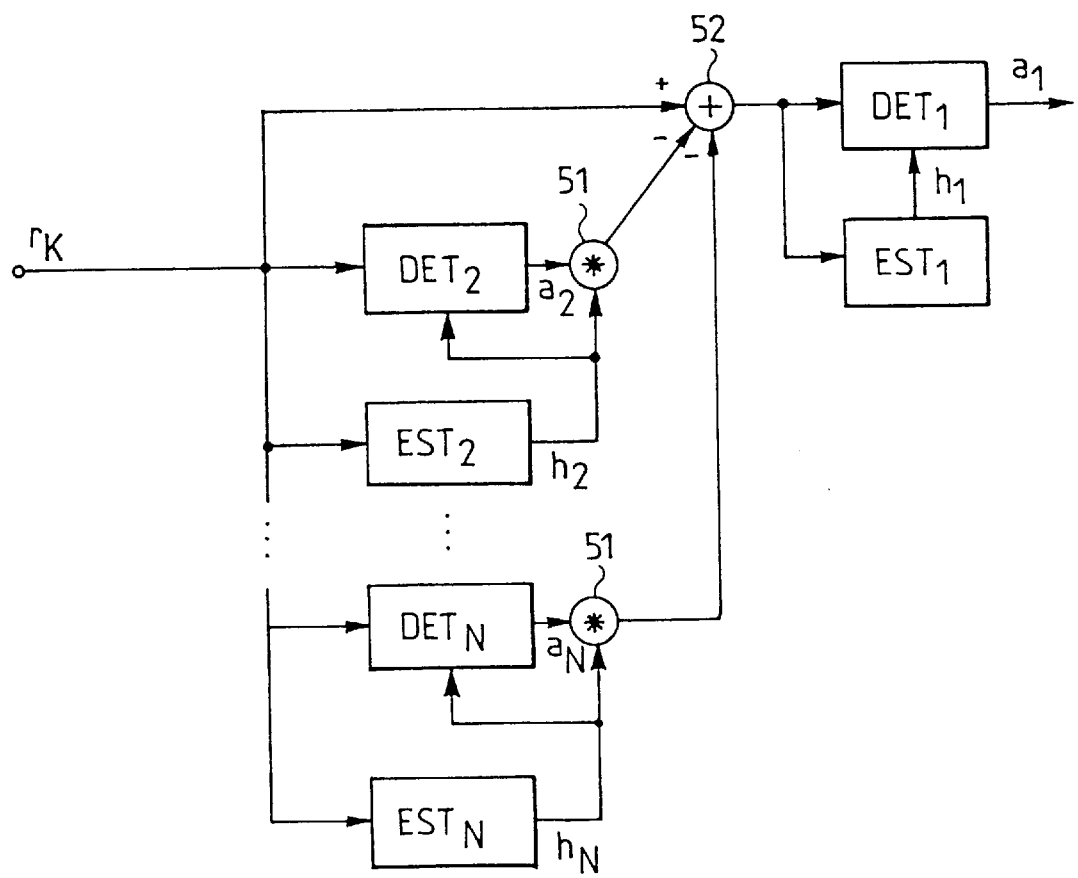
FIG. 3 shows a TDMA burst.
FIG. 5 is a block diagram showing the receiver according to the second embodiment of the invention.

FIG. 5 shows a block diagram of a receiver suitable for asynchronous reception. The receiver comprises a detector $DET_1$ and a channel estimator $EST_1$ for the primary signal, and detectors $DET_2 \ldots DET_N$ and channel estimators $EST_2 \ldots EST_N$ for each interfering signal $R_2 \ldots R_N$. The received signal $r_K$ is applied to each detector $DET_2 \ldots DET_N$ and channel estimator $EST_2 \ldots EST_N$ for interfering co-channel signals. Each channel estimator provides the multipath channel estimate $h_2 \ldots h_N$ of the corresponding interfering signal, which estimate is applied to the corresponding detector $DET_2$ and to the second input of a convolution means 51. The detector $DET_2 \ldots DET_N$ detects the sequence (training sequence) $a_2 \ldots a_N$ of the interfering signal in the received signal by using the provided channel estimate $h_2 \ldots h_N$. The convolution means 51 regenerates the interfering signal by performing a convolution of the sequence $a_2 \ldots a_N$ and correspondingly that of the channel estimate $h_2 \ldots h_N$. The regenerated interfering signals produced in this manner are subtracted from the received $r_k$ signal in a subtraction means 52, whereby the obtained difference signal is in a way "cleaned" of co-channel interference. After this, the channel estimator $EST_1$ of the primary signal calculates the multipath channel estimate $h_1$ of the primary signal from the output of the subtraction means 52, and the detector $DET_1$ detects the transmitted sequence $a_1$ of the primary signal.

In the example of FIG. 5, the interfering signals were treated as parallel processes. Alternatively, the process may be of a serial type, the interfering signals being thus removed from the received signal one at a time. This serial process also enables, in practical solutions, for instance with the use of a signal processor, a single channel estimator and detector perform iteratively, one at a time, interfering signal channel estimation, detection, regeneration and subtraction from the received signal, whereby the received signal is continuously cleaned of co-channel interference at each iteration stage. When all the co-channels have been attended to (for instance N-1 iteration stages), the primary signal is detected in the cleaned received signal.

The accompanying figures and the description relating thereto are merely intended to illustrate the present invention. In their details, the method and the receiver of the invention may vary within the scope and spirit of the appended claims.

We claim:

1. A signal detection method in a receiver of a TDMA mobile system comprising:

receiving a primary signal and at least one interfering co-channel signal on a same TDMA channel, said signals having different but known training sequences and having different multipath propagation and thus different transmission channels on a radio path, determining transmission channel estimates of the primary signal and said at least one interfering co-channel signal by means of the received training sequences, detecting the primary signal by utilizing the transmission channel estimates of both the primary signal and said at least one interfering co-channel signal.

2. A method according to claim 1, wherein the determination of the transmission channel estimates comprises cancelling the cross correlation between the training sequences from the transmission channel estimates by performing a linear transformation on the cross correlation.

3. A method according to claim 2, wherein the linear transformation comprises an inverse cross correlation matrix of the training sequences.

4. A method according to claim 2, wherein obtaining the transmission channel estimates is accomplished by means of a matrix operation from the equation $$\hat{h}_{ML} = (M^{*T}M)^{-1}M^{*T}y,$$

where y represents the received training sequences, and the matrix $M = (M_{1, M2}, \ldots, M_N)$, where $M_n$ is $P \times (L+1)$ matrix consisting of the transmitted training sequence symbols organized as a matrix.

5. A method according to claim 1, wherein the sequences of the training sequences are cyclic transformations of a sequence having high autocorrelation.

6. A method according to claim 1, wherein the determination of the channel estimates comprises estimating the impulse responses of the transmission channels.

7. A method according to claim 6, wherein the primary signal is detected by a Viterbi algorithm, which takes into account the estimates of the impulse responses of both the primary signal and said at least one interfering co-channel signal as well as those of the transmissions channels thereof.

8. A method according to claim 1, wherein the primary signal and said at least one interfering co-channel signal are received essentially in sync.

9. A receiver of a synchronous TDMA mobile system, said receiver receiving a primary signal and at least one interfering co-channel signal on a same TDMA channel, said signals having different but known training sequences and having different multipath propagation and thus different transmission channels on a radio path, the receiver comprising:

a channel estimator, arranged to determine transmission channel estimates of the primary signal and said at least one interfering co-channel signal by means of the received training sequences, and a detecting section for detecting the primary signal by utilizing the transmission channel estimates of both the primary signal and said at least one interfering co-channel signal.

10. A receiver according to claim 9, wherein the transmission channel estimates are estimates of the impulse responses of the transmission channels.

11. A receiver according to claim 10, wherein the detecting section detects the primary signal by using a Viterbi algorithm, which takes into account the estimates of the impulse responses of both the primary signal and said at least one interfering co-channel signal as well as those of the transmissions channels thereof.

12. A signal detection method in a receiver of a TDMA mobile system, comprising:

receiving a received signal including a primary signal and at least one interfering co-channel signal on a same TDMA channel, said signals having different but known training sequences, and said signals having different multipath propagation and thus different transmission channels on a radio path, determining a transmission channel estimate of said at least one interfering co-channel signal, regenerating an interfering signal from the received signal by utilizing the transmission channel estimate of the interfering co-channel signal, subtracting the regenerated interfering co-channel signal from the received signal, determining a transmission channel estimate of the primary signal, and detecting the primary signal by using this transmission channel estimate.

13. A method according to claim 11, wherein there are several interfering co-channel signals, and the determination of the transmission channel estimate, the signal regeneration, and the subtraction of the regenerated co-channel signal from the received signal are performed parallelly or sequentially for each said interfering co-channel signal before the primary signal is detected.

14. A method according to claim 5, wherein said sequence having high autocorrelation is an m-sequence.

15. A method according to claim 12, wherein said primary signal and said at least one interfering co-channel signal are received asynchronously.

* * * * *